3,647,834
ZINC MERCAPTIDE N-ACETYLCYSTEINE
CARBOXYLATE SALTS
Tellis A. Martin, Evanston, Ind., assignor to Mead
Johnson & Company, Evansville, Ind.
No Drawing. Filed Aug. 11, 1969, Ser. No. 849,150
Int. Cl. C07f 3/06
U.S. Cl. 260—429.9         14 Claims

ABSTRACT OF THE DISCLOSURE

Zinc mercaptide N-acetylcysteine carboxylate salts of Formula I wherein M represents one chemical equivalent of a pharmaceutically acceptable salt forming cation relative to said carboxylate are prepared by reaction of the carboxylate with zinc carbonate or zinc oxide. These substances are substantially odorless and tasteless.

Formula I

FIELD OF THE INVENTION

This invention deals with salts of N-acetyl-L-cysteine which are particularly suited for the preparation of formulations. N-acetyl-L-cysteine has a number of applications in the fields of therapeutics and cosmetics. For example, the substance is useful topically for the treatment of acne and other types of inflammatory ulcerations of the skin. It is also useful in hairwaving lotions. On oral administration it is useful in urology for the maintenance of urinary tract patency, and also as an anti-inflammatory agent in the treatment of arthritis. Nebulized aqueous solutions thereof are administered by inhalation for the purpose of removing mucous from the respiratory tract.

DESCRIPTION OF THE PRIOR ART

Although extensive art exists with respect to the foregoing uses of N-acetyl-L-cysteine, little prior effort has been directed to the preparation of substantially odorless forms thereof which may be used for these purposes, U.S. Pat. No. 3,091,569 describes mucolytic use of acetylcysteine and discloses that the sodium, ammonium, calcium, and magnesium salts may be employed for this purpose. Hair waving compositions containing N-acetyl-L-cysteine are described in U.S. Pat. No. 3,242,052, but again only known formulation techniques are disclosed for the preparation of these waving lotions. Other art exists as to the anti-inflammatory and mucolytic properties thereof, but these publications do not describe zinc mercaptide products of the present type.

SUMMARY OF THE INVENTION

It is an object of the present invention to provide improved compositions of N-acetyl-L-cysteine which are substantially odorless and tasteless and which are adapted for use in the preparation of pharmaceutical and cosmetic formulations suitable for the established uses of N-acetyl-L-cysteine. It has been found that the zinc mercaptide N-acetylcysteine carboxylates of Formula I are essentially odorless and tasteless and are suitable for the preparation of pharmaceutical and cosmetic formulations.

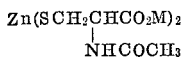

Formula I

These novel substances have the further unexpected advantage of eliminating the odor and substantially improving the taste of N-acetylcysteine carboxylates of the formula

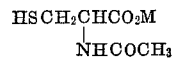

when used in combination therewith, in amounts of from 2 to 10% by weight thereof. In other words it has been found that not only are the zinc mercaptide N-acetylcysteine carboxylates of Formula I substantially odorless and tasteless, but also that compositions containing from 2 to 10 parts by weight thereof with from 90 to 98 parts by weight of N-acetylcysteine carboxylate are substantially odorless and have improved taste compared to the pure N-acetylcysteine carboxylate.

In each of the foregoing formulas the symbol M refers to one chemical equivalent of a salt-forming cation relative to the carboxyl group of N-acetylcysteine which is substantially non-toxic and non-irritating. The terms "non-toxic" and "non-irritating" are relative terms with respect to the intended use be it topical, systemic, or industrial. Suitable pharmaceutically and cosmetically acceptable salt-forming cations include sodium, potassium, calcium, magnesium, barium, zinc, bismuth, aluminum, lithium, ammonium, triethylammonium, hydroxyethylammonium, trihydroxyethylammonium, piperazinium, etc. Mixed cations derived from polyvalent metal hydroxides partially neutralized with a non-toxic and non-irritating acid other than N-acetylcysteine may also be employed. Examples are calcium basic acetate ($CH_3CO_2CaOH$), and aluminum basic accetate [$(CH_3CO_2)_2AlOH$)]. In such more complex cations one or more of the metallic valences, but not all, are combined with a non-toxic and non-irritating anion and the remainder serve the function of M in the foregoing formulas.

The products of Formula I are prepared by reaction of N-acetylcysteine carboxylate of the formula

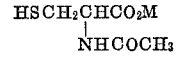

with $Zn^{++}$ in the molar ratio of one-half gram atomic portion of $Zn^{++}$ per molecular proportion of N-acetylcysteine carboxylate assuming M to be a mono valent. In those instances when the M is divalent, the $Zn^{++}$ supplying reactant is used in equimolar proportions. Similarly, if the cation M of the N-acetyl-L-cysteine carboxylate is trivalent, the $Zn^{++}$ is reacted therewith in the ratio of 3 gram atomic portions thereof to 2 molar portions of N-acetyl-L-cysteine carboxylates. The foregoing can be summarized by defining M as one chemical equivalent of a salt-forming cation with respect to the carboxylate and then stating that one chemical equivalent of the resulting carboxylate is caused to react with one-half gram atomic proportion of $Zn^{++}$.

The reaction is carried out in aqueous solution in the presence of a base at a pH in excess of 9.9 at room temperature. Temperatures somewhat above or below room temperature in the range of about 0 to 60° C. may be employed, however. The products are then recovered by drying the reaction solution, or by other suitable means. Lyophilization is generally suitable and convenient.

Suitable bases include zinc oxide, zinc carbonate and the alkali metal oxides, hydroxides, carbonates, and bicarbonates, such as sodium hydroxide, sodium carbonate, and sodium bicarbonate. Non-toxic nitrogenous bases may also be employed such as ammonia, or triethanolamine.

As source of ionic zinc, zinc carbonate or zinc oxide or a zinc salt of a strong acid may be employed. Zinc carbonate and zinc oxide are in fact preferred since they can serve both as the base referred to above and as source of ionic zinc. They are employed in the molar proportion of 1 mole of zinc carbonate or zinc oxide per two chemical equivalents of N-acetylcysteine carboxylate,

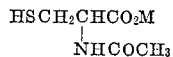

By zinc salt of a strong acid is meant the zinc salt of an acid having a pKa value of less than 9.9. The pKa of the thiol group of N-acetylcysteine carboxylate is 9.9 and if the zinc salt of a weaker acid is employed, i.e. an acid with pKa >9.9, then there is no need for additional neutralizing base. In most instances, however, according to this mode of operation, a zinc salt such as zinc chloride, zinc sulfate, zinc nitrate, or zinc acetate will be employed in conjunction with a neutralizing base. The base is used either in substantially chemically equivalent amount with respect to the thiol group of the N-acetylcysteine carboxylate or in sufficient amount to provide a pH value in excess of 9.9 in the reaction solution. pH 9.9, of course, is the neutralization point for the thiol of N-acetyl-L-cysteine carboxylate.

When using zinc carbonate or other carbonate as base, it is desirable to warm the reaction solution to drive off by-product $CO_2$ prior to lyophilization since the presence of the dissolved gas in the frozen solution may reduce the efficiency of the lyophilizer apparatus. Conventional apparatus for the drying of solutions from the frozen state is employed for this purpose. The products obtained from lyophilization are in substantially pure crystalline form and require no further purification. The only contaminant sometimes encountered is water of hydration. This can be driven off if desired by vacuum drying at an elevated temperature of 80–100° C. including sometimes the use of a desiccant such as phosphorous pentoxide. Removal of water of hydration is not ordinarily necessary or even desirable with respect to crystalline products since the water of hydration is not usually detrimental to the preparation of pharmaceutical and cosmetic formulations. In some instances the anhydrous salts are hygroscopic and the hydrated forms are not.

It has been stated above that the preparation is carried out in aqueous solution. By this it is meant a liquid reaction medium comprised of about 50% or more of water. The balance may be an organic solvent such as ethanol, methanol, or acetone or in some instances, a water immiscible solvent. According to the specific embodiments described hereinafter, however, no specific example of an organic diluent is disclosed although such may be appropriate in some instances, and is within the skill of the art to determine.

The compositions of the present invention containing from 2 to 10 parts by weight of a zinc mercaptide N-acetyl-L-cysteine carboxylate and from 90 to 98 parts by weight of N-acetylcysteine carboxylate can be prepared in at least two ways. One, of course, is by simple mechanical mixing of the pure pulverulent components in the usual type blending apparatus employed in pharmaceutical research and manufacturing. An alternative method which is frequently convenient is to manufacture the zinc mercaptide N-acetylcysteine carboxylate in situ according to one of the following processes where a reduced proportion of zinc reactant of from 2% to 10% the amount required to prepare the pure zinc mercaptide product is employed. The mixture obtained on lyophilization is a composition containing the zinc mercaptide N-acetylcysteine carboxylate in minor proportion. This mode of operation can be adapted by calculated adjustment of the reaction charge to the preparation of any desired mixture composition. This and manufacturing processes for the preparation of the pure zinc mercaptide N-acetylcysteine carboxylates are illustrated in the following examples.

DESCRIPTION OF SPECIFIC EMBODIMENTS

Temperatures are stated in degrees centigrade unless designated otherwise.

Procedure 1.—N-acetyl-L-cysteine calcium salt

To a stirred mixture of 2.5 kg. (15.3 moles) of N-acetyl-L-cysteine and 7.5 l. of water in a 22 l. 3-necked reaction flask equipped with a mechanical stirrer and thermometer was added 850 g. (8.5 moles) of calcium carbonate in batches during 1 hr. After stirring further for 1 hr. under reduced pressure (aspirator) at 35°, the excess calcium carbonate was removed by filtration and washed with about 1 l. of water. The filtrate was lyophilized at a temperature of 100° F. overnight and then 140° F. for 6 hrs.; condenser temperature of −65° F., and pressure of 50–100 microns. An identical second preparation was made. The combined batches were first dried in a vacuum oven at 70–80°, micropulverized and then dried further to constant weight in the vacuum oven; yield, 5.3 kg. (96%) of white powder; M.P. ca. 200–220° d.; $[\alpha]_D^{25}+19.32$ (c. 5, $H_2O$).

Analysis.—Calcd. for $C_{10}H_{16}N_2O_6S_2Ca$ (percent): N, 7.69; SH, 18.1; Ca, 11.00. Found (percent): N, 7.55; SH, 17.6; Ca, 10.76, 11.16.

Procedure 2.—N-acetyl-L-cysteine sodium salt

To a stirred mixture of 163.2 g. (1.0 mole) of N-acetyl-L-cysteine and 1.2 l. of water was added slowly a solution of 40 g. of sodium hydroxide pellets in 300 ml. of water. During this operation the reaction temperature began to increase and cooling was necessary to maintain the temperature at 25–30°. Then the pH of the reaction mixture was adjusted to 7 by the addition of small quantities of 2 N NaOH. After diluting the reaction mixture to a total volume of 3.5 l., lyophilization served to give a hygroscopic white solid; M.P. ca. 82–86°. After drying in vacuo at 80° over phosphorus pentoxide, the product melted at 120–122° d.; $[\alpha]_D^{25}+21.52°$ (c. 5, $H_2O$).

Analysis.—Calcd. for $C_5H_8NO_3SNa$ (percent): C, 32.43; H, 4.35; N, 7.56. Found (percent): C, 32.13; H, 4.35; N, 7.53.

Procedure 3.—N-acetyl-L-cysteine magnesium salt monohydrate

To a stirred suspension of 326.4 g. (2.0 mole) of N-acetyl-L-cysteine and 1200 ml. of water was added gradually 106 g. (1.1 mole) of magnesium carbonate. The reaction mixture was warmed in vacuo sufficiently to remove dissolved carbon dioxide, and then filtered. Magnesium carbonate was removed by filtration and the filtrate lyophilized as described in Procedure 1; yield, 340 g. (98%) of white solid after drying at 80° overnight in a vacuum oven; M.P. 207.5–235.5° dec.; $[\alpha]_D^{25}+18.0°$ (c. 5, $H_2O$).

Analysis.—Calcd. for $C_{10}H_{16}N_2O_6S_2Mg \cdot H_2O$ (percent): C, 32.75; H, 4.92; N, 7.64; SH, 18.0; Mg, 6.63. Found (percent): C, 32.86; H, 4.98; N, 7.74; SH, 18.4; Mg, 7.06.

On drying at 100° in vacuo the anhydrous material is obtained.

Analysis.—Calcd. (percent): C, 34.44; H, 4.63. Found (percent): C, 34.58; H, 4.76.

Procedure 4.—Calcium N-acetyl-L-cysteinate acetate

To a stirred mixture of 163.2 g. (1.0 mole) of N-acetyl-L-cysteine, 60 g. (1.0 mole) of acetic acid, and 600 ml. of water was added gradually 110 g. (1.1 mole) of calcium carbonate. Rapid evolution of carbon dioxide followed each addition. After stirring overnight, the excess calcium carbonate was removed by filtration. The product was isolated by lyophilization of the filtrate as described in Procedure 1; yield, 237 g. (91%) of white solid after drying overnight in a vacuum oven at 80°. This material showed 0.95% of moisture. Further drying in a vacuum oven at 90–95° gave the product; M.P. ca. 215–260° dec.; $[\alpha]_D^{25}+12.4°$ (c. 5, $H_2O$).

Analysis.—Calcd. for $C_7H_{11}NO_5SCa$ (percent): C, 32.17; H, 4.24; N, 5.36; SH, 12.65; Ca, 15.34. Found (percent): C, 31.88; H, 4.24; N, 5.55; SH, 12.4; Ca, 14.65.

EXAMPLE I

N-acetyl-L-cysteine zinc salt

 |
NHCOCH₃

To a mixture of 489.6 g. (3 moles) of N-acetyl-L-cysteine and 1.5 l. of H₂O was added gradually 335 g. (3 moles) of ZnCO₃. After concentrating for a short while to remove dissolved CO₂, the reaction mixture was filtered. The filtrate was lyophilized, yielding a snowflake-like solid which was pulverized and dried in a vacuum oven at 100°; yield, 651 g. (96%) of product which darkens when heated in a capillary tube at ca. 274–300°; $[\alpha]_D^{25} +26.9°$ (c. 5, H₂O).

*Analysis.*—Calcd. for $C_{10}H_{14}N_2O_6S_2Zn_2$ (percent): C, 26.41; H, 3.11; N, 6.18; S, 14.15; Zn, 28.8. Found (percent): C, 26.29; H, 3.49; N, 5.93; S, 14.38; Zn, 28.5.

This product is completely odorless and tasteless. The infrared spectrum exhibits —COO— and —NHCO— absorption maxima at 6.0–6.6 microns, but —COOH absorption is absent. As a further aid in structure proof, benzylation of 18 g. of this product by reaction with benzyl chloride in water at neutral pH gave 18 g. (89%) of N-acetyl-S-benzyl-L-cysteine. Under these conditions only the mercaptide is susceptible to benzylation.

EXAMPLE II

N-acetyl-L-cysteine sodium zinc salt monohydrate

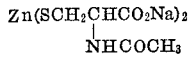
 |
NHCOCH₃

To a suspension of 98 g. (0.6 mole) of N-acetyl-L-cysteine and 300 ml. of H₂O was added batchwise 6 N NaOH until adjusted to pH 7 using a pH meter. Then a total of 34 g. (0.3 mole) of ZnCO₃ was added portionwise. The product was isolated by filtration and lyophilization as in Example I; yield, 125 g. (96%) of white solid of M.P. 254–260.5° d.; $[\alpha]_D^{25} +20.14°$ (c. 5, H₂O). The infrared spectrum exhibits —NHCO— band at 6.25 microns and —COO— at 6.5 microns.

*Analysis.*—Calcd. for $C_{10}H_{14}N_2O_6S_2Na_2Zn \cdot H_2O$ (percent): C, 26.59; H, 3.57; N, 6.20; Na, 10.18; Zn, 14.47. Found (percent): C, 26.88; H, 3.40; N, 5.93; Na, 9.92; Zn, 14.3.

This odorless and stable salt can be dehydrated at 100° in vacuo to the anhydrous product which rapidly absorbs moisture when exposed to the atmosphere to regenerate the hydrate.

EXAMPLE III

N-acetyl-L-cysteine calcium zinc salt monohydrate

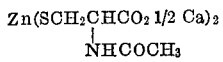
 |
NHCOCH₃

To a mixture of 196 g. (1.2 moles) of N-acetylcysteine and 588 ml. of H₂O, 64 g. (0.64 mole) of CaCO₃ was added during 20 min. After warming at 35–40° for 20 min. and warming in vacuo briefly to remove dissolved CO₂, the reaction mixture was filtered. The filtrate was treated with 68 g. (0.6 mole) of ZnCO₃. After elimination of dissolved CO₂, the product was isolated by filtration and lyophilization as in Example I; yield, 261 g. (97%); M.P. 360°; $[\alpha]_D^{25} +27.32°$ (c. 5, H₂O). The infrared spectrum exhibits a broad band at 6.0–6.6 microns.

*Analysis.*—Calcd. for $C_{10}H_{14}N_2O_6S_2CaZn \cdot H_2O$ (percent): C, 26.94; H, 3.62; N, 6.28; Ca, 8.99; Zn, 14.66. Found (percent): C, 26.84; H, 3.66; N, 6.03; Ca, 9.14; Zn, 14.3.

This product is odorless and tasteless. It is converted to the anhydrous salt by drying at 100° in vacuo.

*Analysis.*—Calcd. (percent): C, 28.07; H, 3.30. Found (percent): C, 27.71; H, 3.44.

This product was selectively S-benzylated to yield N-acetyl-S-benzyl-L-cysteine in 94% yield on treatment of an aqueous solution thereof with benzyl chloride.

EXAMPLE IV

N-acetyl-L-cysteine magnesium zinc salt

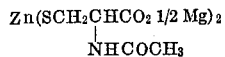
 |
NHCOCH₃

N-acetyl-L-cysteine magnesium salt monohydrate prepared as described in Procedure 3, 366 g. (1 mole) is dissolved in 1 l. of water and treated with 112 g. (1 mole) of zinc carbonate. The mixture is warmed to about 50° in vacuo (water aspirator) to assist in removal of carbon dioxide, filtered to remove small amounts of insoluble material, and the filtrate lyophilized as described in Procedure 1. The product is obtained in pure crystalline form as white solid after drying in a vacuum oven at 100°; composition $C_{10}H_{14}N_2O_6S_2MgZn$.

EXAMPLE V

Calcium zinc N-acetyl-L-cysteinate acetate

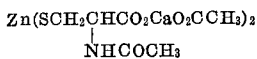
 |
NHCOCH₃

Calcium N-acetyl-L-cysteinate acetate prepared as described in Procedure 4, 261 g. (1.0 mole) is dissolved in 500 ml. of water and treated with 56 g. (0.5 mole) of zinc carbonate. The reaction mixture is then heated as described in Example IV for removal of carbon dioxide and the product is recovered as described in Example IV as a white crystalline solid; composition $$C_{14}H_{20}N_2O_{10}S_2Ca_2Zn.$$

EXAMPLE VI

N-acetyl-L-cysteine ammonium zinc salt

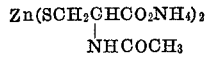
 |
NHCOCH₃

A stirred suspension of 163.2 g. (1.0 mole) of N-acetyl-L-cysteine in 600 ml. of water is carefully neutralized by treatment with 73 ml. (1.1 mole) of 28% aqueous ammonia. The solution is then warmed at 50° in vacuo (water aspirator) for 1 hr. to remove excess ammonia, and is then treated with 56 g. (0.5 mole) of zinc carbonate. The mixture is again heated at 50° in vacuo (water aspirator) to remove evolved carbon dioxide, filtered to remove a small amount of insoluble material, and the product recovered by lyophilization of the filtrate as described in Procedure 1; composition $$C_{10}H_{16}N_2O_6S_2 \cdot (NH_3)_2Zn.$$

EXAMPLE VII

Composition containing 2% by weight of

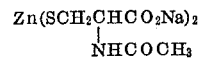
 |
NHCOCH₃ and 98% by weight of N-acetyl-L-cysteine sodium salt

The procedure of Example II is repeated employing 0.63 gm. (0.005 mole) of zinc carbonate rather than the quantity specified in Example II. After lyophilization and drying in vacuo at 80° over phosphorus pentoxide, there results a composition which contains 2% by weight of N-acetyl-L-cysteine sodium zinc salt and 98% by weight of N-acetyl-L-cysteine sodium salt.

By varying the proportions of zinc carbonate employed in the preceding example, other compositions may be made having higher proportions of N-acetyl-L-cysteine sodium zinc salt in the range of from 2 to 10 parts by weight thereof in combination with from 90 to 98 parts by weight of N-acetyl-L-cysteine sodium salt.

EXAMPLE VIII

Composition containing 10% by weight of

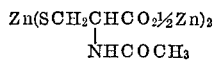

and 90% by weight of N-acetyl-L-cysteine magnesium salt monohydrate

The magnesium salt described in Procedure 3 90 g., and 10 g. of the product of Example I are mixed on a piece of glazed paper and then thoroughly blended to provide a composition containing 10% by weight of the zinc salt which can be stored in a closed bottle for a prolonged period without the development of hydrogen sulfide odor.

Similarly, from 2 to 10 parts by weight of any of the products of Example I, II, III, IV, V, or VI may be blended with from 90 to 98 parts by weight of any of the products of Procedure 1, 2, 3, or 4 to give other compositions of the present invention which remain substantially free of hydrogen sulfide odor on prolonged storage in a closed container.

The foregoing compositions may in turn be diluted with pharmaceutical carriers in compounding pharmaceutical dosage forms thereof, or they may be employed in cosmetics. Additional-therapeutically active ingredients may be included in pharmaceutical dosage forms thereof.

EXAMPLE IX

Process for preparing N-acetyl-L-cysteine calcium zinc salt employing zinc oxide The procedure of Example III is repeated substituting 49 g. (0.6 mole) of zinc oxide for the zinc carbonate specified in that example. In the present example it is unnecessary to warm the reaction mixture in a vacuum to eliminate dissolved $CO_2$. The product obtained is identical to that described in Example III.

EXAMPLE X

N-acetyl-L-cysteine calcium zinc salt prepared from zinc chloride and a neutralizing base The procedure of Example III is repeated substituting 82 gms. (0.6 mole) of zinc chloride for the zinc carbonate specified in that example. Again warming in vacuo to eliminate $CO_2$ is unnecessary. However, in this instance, sufficient sodium hydroxide is added to the reaction mixture to adjust to pH 10. In this instance the product produced is contaminated with sodium chloride but for many purposes this is no disadvantage and the product is useful as such without further purification.

What is claimed is:

1. The zinc mercaptide N-acetylcysteine salt of the formula

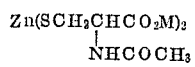

wherein M represents a non-toxic and non-irritating cation.

2. The zinc mercaptide N-acetylcysteine salt of the formula

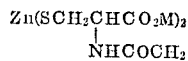

wherein M is selected from the group consisting of sodium, potassium, calcium, magnesium, barium, zinc, bismuth, aluminum, lithium, ammonium, triethylammonium, hydroxyethylammonium, trihydroxyethylammonium, piperazinium, $CH_3CO_2Ca$, and $(CH_3CO_2)_2Al$.

3. The compound of claim 2 wherein M is ½ Zn.
4. The compound of claim 2 wherein M is ½ Ca.
5. The compound of claim 2 wherein M is Na.
6. The compound of claim 2 wherein M is ½ Mg.
7. The compound of claim 2 wherein M is $CH_3CO_2Ca$.
8. The compound of claim 2 wherein M is $NH_4$.
9. The process for preparing the zinc mercaptide N-acetylcysteine carboxylate salt of the formula

wherein M represents a non-toxic and non-irritating cation which process comprises treating an N-acetylcysteine carboxylate of the formula

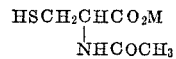

wherein M has the same meaning as above with one-half gram atomic proportion of $Zn^{++}$ relative to said N-acetylcysteine carboxylate in aqueous solution in the presence of a base to provide a pH of at least 9.9.

10. The process for preparing the zinc mercaptide N-acetylcysteine carboxylate salt of the formula

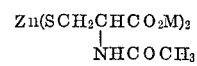

wherein M is selected from the group consisting of sodium, potassium, calcium, magnesium, barium, zinc, bismuth, aluminum, lithium, ammonium, triethylammonium, hydroxyethylammonium, trihydroxyethylammonium, piperazinium, $CH_3CO_2Ca$, and $(CH_3CO_2)_2Al$ which comprises treating an N-acetylcysteine carboxylate of the formula

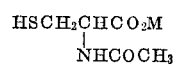

wherein M has the same meaning as above with one-half gram atomic proportion of the $Zn^{++}$ relative to said N-acetylcysteine carboxylate in aqueous solution in the presence of a base to provide a pH of at least 9.9.

11. The process of claim 9 wherein a one-half molecular proportion of $ZnCO_3$ is reacted with said N-acetylcysteine carboxylate.

12. The process of claim 9 wherein a one-half molecular proportion of ZnO is reacted with said N-acetylcysteine carboxylate.

13. The process of claim 9 wherein said $Zn^{++}$ is supplied as a water soluble zinc salt of an acid having a pKa value of less than 9.9 and said base is an alkali metal hydroxide, carbonate, or bicarbonate.

14. The process of claim 9 wherein from 0.01 to 0.05 gram atomic proportions of $Zn^{++}$ relative to said N-acetylcysteine carboxylate is employed.

References Cited

UNITED STATES PATENTS

| | | | |
|---|---|---|---|
| 2,607,789 | 8/1952 | Weiss | 260—430 |
| 2,745,859 | 5/1956 | Norton | 260—429.9 |
| 3,193,463 | 7/1965 | Schweizer | 260—429.9 X |

JAMES E. POER, Primary Examiner

H. M. S. SNEED, Assistant Examiner

U.S. Cl. X.R.

260—999; 424—72, 319